(12) United States Patent
Hamlin

(10) Patent No.: US 8,136,161 B2
(45) Date of Patent: Mar. 13, 2012

(54) 3-PRONG SECURITY/RELIABILITY/REAL-TIME DISTRIBUTED ARCHITECTURE OF INFORMATION HANDLING SYSTEM

(75) Inventor: Christopher Hamlin, Los Gatos, CA (US)

(73) Assignee: LSI Corporation, Milpitas, CA (US)

( * ) Notice: Subject to any disclaimer, the term of this patent is extended or adjusted under 35 U.S.C. 154(b) by 226 days.

(21) Appl. No.: 12/699,463

(22) Filed: Feb. 3, 2010

(65) Prior Publication Data

US 2010/0138923 A1    Jun. 3, 2010

Related U.S. Application Data

(62) Division of application No. 10/635,015, filed on Aug. 4, 2003, now Pat. No. 7,712,140.

(51) Int. Cl.
G06F 11/00 (2006.01)
G06F 12/14 (2006.01)
G06F 12/16 (2006.01)
G08B 23/00 (2006.01)

(52) U.S. Cl. ............................ 726/23; 713/501; 713/601

(58) Field of Classification Search ........................ None
See application file for complete search history.

(56) References Cited

U.S. PATENT DOCUMENTS

| | | | |
|---|---|---|---|
| 6,202,159 B1 | 3/2001 | Ghafir et al. | |
| 6,282,627 B1 | 8/2001 | Wong et al. | |
| 6,330,670 B1 | 12/2001 | England et al. | |
| 6,408,391 B1 | 6/2002 | Huff et al. | |
| 6,438,666 B2 | 8/2002 | Cassagnol et al. | |
| 6,449,367 B2 | 9/2002 | Van Wie et al. | |
| 6,968,420 B1 | 11/2005 | Giles | |
| 7,089,419 B2 * | 8/2006 | Foster et al. | 713/166 |
| 7,117,352 B1 | 10/2006 | Giles | |
| 7,146,504 B2 | 12/2006 | Parks et al. | |
| 7,224,805 B2 | 5/2007 | Hurst et al. | |
| 7,228,440 B1 | 6/2007 | Giles | |
| 7,254,716 B1 | 8/2007 | Giles | |
| 7,254,720 B1 | 8/2007 | Giles | |
| 7,308,717 B2 | 12/2007 | Kovel et al. | |
| 7,346,780 B2 | 3/2008 | Sinha et al. | |
| 7,529,929 B2 | 5/2009 | Asokan et al. | |
| 7,536,715 B2 | 5/2009 | Markham | |
| 7,549,056 B2 | 6/2009 | Carr | |
| 7,587,611 B2 * | 9/2009 | Johnson et al. | 713/186 |
| 2004/0039932 A1 | 2/2004 | Elazar et al. | |
| 2004/0054894 A1 | 3/2004 | Lambert | |

OTHER PUBLICATIONS

Daemen, Joan et al., Dr. Dobb's Portal | Rijndael: The Advanced Encryption Standard, Dr. Dobb's Journal, Mar. 1, 2001, pp. 1-9.

* cited by examiner

*Primary Examiner* — Kaveh Abrishamkar
*Assistant Examiner* — Nadia Khoshnoodi
(74) *Attorney, Agent, or Firm* — Suiter Swantz pc llo

(57) ABSTRACT

The present invention is directed to a distributed architecture of an information handling system, including a buried nucleus inaccessible for inspection without heroic means while the buried nucleus is in operation, and a trusted authority for generating a secure protocol. The secure protocol controls the operation of the buried nucleus.

3 Claims, 2 Drawing Sheets

3-PRONG SECURITY/RELIABILITY/REAL-TIME DISTRIBUTED ARCHITECTURE OF INFORMATION HANDLING SYSTEM

CROSS-REFERENCE TO RELATED APPLICATIONS

The present application is a divisional application of and claims priority under 35 U.S.C. §121 to U.S. application Ser. No. 10/635,015 entitled: 3-Prong Security/Reliability/Real-Time Distributed Architecture of Information Handling System filed Aug. 4, 2003. The U.S. application, Ser. No. 10/635, 015 is herein incorporated by reference in its entirety.

FIELD OF THE INVENTION

This invention relates generally to an information handling system, and particularly to a 3-prong security/reliability/real-time distributed architecture for an information handling system.

BACKGROUND OF THE INVENTION

There are three well known fundamental problems in an information handling system: security, reliability, and real-time behavior. Security refers to a system's ability to prevent unauthorized agents from performing actions while permitting authorized agents to perform actions. Security is related to data protection and privacy, and especially related to digital rights management (DRM). Reliability refers to a system's robustness in handling information. Real-time behavior refers to a system's ability to update information as the information is received, enabling the system to direct or control processes. It is understood that an information handling system here is defined as a group of related components that interact to process information. An information handling system may be hardware only, software only, or a combination of hardware and software.

Traditional solutions to the foregoing-indicated three problems have emphasized on solving each problem separately. However, this approach is sub-optimal from both an architectural and an economic point of view, as it fails to exploit the synergies of the interdependence an architecture may provide.

A legacy architecture of an information handling system, that is, a traditional microprocessor and operating system structure (e.g., UNIX or Microsoft Windows running on an Intel processor), is inherently insecure and is also not scalable. Therefore, a legacy architecture applies very poorly to a distributed environment scaled both in the number of supported devices and in behavior or performance.

Thus, it would be desirable to provide an architecture for an information handling system which simultaneously addresses security, reliability, and real-time behavior problems inherent in the known art, while also solving legacy architecture scalability and security problems.

SUMMARY OF THE INVENTION

Accordingly, the present invention is directed to a distributed architecture of an information handling system which addresses security, reliability, and real-time behavior problems. In one aspect of the present invention, a 3-prong security/reliability/real-time distributed architecture in accordance with the present invention may have one or more of the following features: (1) system solutions; (2) characterizability; (3) architectural independence of implementation means; (4) interdependence of functions; (5) security characterization; (6) quasi-stability; (7) buried nucleus; (8) adaptation; (9) reliability; (10) secure protocol; (11) ability to rebuild after intrusion; and (12) isochronous real-time foundation.

In an additional aspect of the present invention, a distributed architecture of an information handling system includes a buried nucleus inaccessible for inspection without heroic means while the buried nucleus is in operation, and a trusted authority for generating a secure protocol. The secure protocol may control the operation of the buried nucleus.

In another aspect of the present invention, a distributed architecture of an information handling system includes a hardware/software system, and a trusted authority for generating a secure protocol. The secure protocol may control the operation of the hardware/software system. Preferably, the hardware/software system includes a microchip which includes a buried nucleus and an outer region having I/O pins. The hardware/software system may further include external software connected to I/O pins for controlling I/O pins. The buried nucleus may also be equipped to accept and decipher an encrypted key delivered through a secure protocol. An operating buried nucleus may not be accessible for inspection without heroic means.

In a further aspect of the present invention, a method for protecting encrypted information on a network from, for example, a grid dribble attack, includes the following steps: (1) setting a buried nucleus in a quasi-stable mode of operation; (2) stopping clocking when the buried nucleus deviates from the quasi-stable mode; (3) rebuilding a secure environment within the buried nucleus after an intrusion is detected; and (4) stopping clocking when replication of re-buildup by an attacker is detected.

It should be understood the foregoing general description and following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
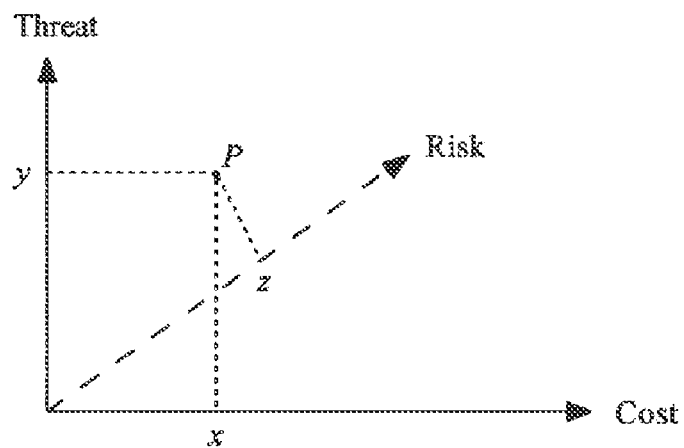
FIG. 1 is a schematic diagram illustrating a three-dimension cost/threat/risk space.

Reference will now be made in detail to the presently preferred embodiments of the invention, examples of which are illustrated in the accompanying drawings.

According to one aspect of the present invention, a secure distributed structure may only be founded on a secure base. Likewise, a secure distributed structure may not be retrofitted to an insecure base such as a legacy architecture (whether in hardware or software). Furthermore, large networks of secure digital clients require such a foundation.

I. Architecture Features

The 3-prong security/reliability/real-time distributed architecture in accordance with the present invention may have one or more of the following features: (1) system solutions; (2) characterizability; (3) architectural independence of implementation means; (4) interdependence of functions; (5) security characterization; (6) quasi-stability; (7) buried nucleus; (8) adaptation; (9) reliability; (10) secure protocol; (11) ability to rebuild after intrusion; and (12) isochronous real-time foundation.

(1) System Solutions

Although the three functions (security, reliability, and real-time behavior) are susceptible to individual point solutions, these point solutions are distinctly sub-optimal from both an architectural and an economic point of view and fail to exploit the synergies of interdependence an architecture may provide.

According to the present invention, the triad of functional objectives (security, reliability, and real-time behavior) may be synergistic and may therefore best be achieved simultaneously in a 3-prong security/reliability/real-time distributed architecture, which unifies the means employed for each objective as the basis for cost-effective scalability. That is, rather than treating security, reliability, and real-time behavior as independent point problems or independent point solutions, the three areas may be treated as interrelated problems that share certain common underlying architectural features.

(2) Characterizability

Any instantiation of a 3-prong security/reliability/real-time distributed architecture of the present invention may be characterizable in each function domain (security, reliability, or real-time behavior).

The characterization of the present invention is extremely important and very fundamental because many point solutions in this phase which are available today are extremely difficult to characterize, forcing construction of over built, inefficient, problematic, and over provisioned solutions. One must apply more resources to solving the problem than required from a systems point of view.

(3) Architectural Independence of Implementation Means

According to a preferred embodiment of the present invention, invariant architecture is independent from characterizable implementations. A fundamental characteristic of the 3-prong security/reliability/real-time distributed architecture of the present invention is that the architecture may be viewed independently of a particular instantiation or implementation. The architecture is invariant. That is, the particular functional characteristics of the architecture in terms of how the architecture actually provides security, how the architecture actually provides real-time behavior, and how the architecture actually provides reliability, are preferably fixed. However, the extent to which the architecture provides those characteristics in a particular instantiation or implementation may actually be characterized quantitatively. That is, while the architecture remains fixed, variants of the architecture may have very modest resource consumptions or may be very powerful. In this way, the level of performance for the particular characterization may be scaled according to how the present invention is implemented.

The architecture of the present invention may apply to a distributed environment which is scalable both in the number of supported devices, e.g., from a couple of devices to literally billions of devices, and in behavior or performance. The distributed environment may be a very tiny device, like an embedded behavior or performance. The distributed environment may be a smart card or may be a supercomputer mainframe. The architecture according to the present invention may address that entire scaling range, and may be suitable for a very small numbers of devices or suitable for accommodating very large aggregates of devices with respect to the three fundamental problems of security, reliability and real-time behavior.

According to the present invention, with fixed architecture, the architecture may be implemented in many ways. The architecture may be implemented entirely in hardware for some purposes, the architecture may be implemented entirely in software for other purposes, or the architecture may be implemented in a combination of hardware and software for yet other markets and allocation sets.

According to the present invention, the architecture itself may not require a hardware-only, a software-only, or a hardware/software implementation. The characterization of the delivery of security, reliability and real-time behavior in each of those settings may be different and may be characterized differently as a result of the choices made in implementation.

(4) Interdependence of Functions

The functions of security, reliability, and real-time behavior are interdependent within the architectural structure of the present invention.

(5) Security Characterization

According to the present invention, security may be characterized based on a formal cost/threat/risk model, where the cost is a cost of implementing a defense against an attack, the risk is a value of an asset that is under attack, and the threat is a level of investment that an attacker is willing to make. According to the present invention, there is really no such thing as an unbreakable system, but instead, the concept of characterization is used to indicate that in a three-dimension space as shown in FIG. 1, one may characterize efficacy of a solution in terms of cost, threat and risk.

As shown in FIG. 1, a particular instantiation of the 3-prong security/reliability/real-time distributed architecture of the present invention may occupy a position P within a cost/threat/risk space. Thus, for the particular instantiation corresponding to the position P, one is placing an asset with a z amount of value at risk, and one is willing to invest a x amount of cost in ensuring that the asset is protected on the assumption that an attacker is not willing to invest more than a y amount of effort or dollars. All of these things (cost, threat, and risk) may, of course, be expressed in a dollar value.

It is noted that different instantiations of the 3-prong security/reliability/real-time distributed architecture of the present invention may occupy different positions of the cost/threat/risk space shown in FIG. 1. For example, if an instantiation is an ATM machine, the risk is great because the value of the asset under attack is great, so one would be willing to spend a lot on the protection, and one also has to assume an attacker would be willing to spend significantly on the attack. However, if all one is trying to protect is an e-mail for one particular day that has an inconsequential content, then cost and risk would be low, and one may not really care if the data are infiltrated by a hacker. The security characterization will be more fully described with the DRM.

(6) Quasi-Stability

The 3-prong security/reliability/real-time distributed architecture of the present invention may have quasi-stability. Cumulative attacks may be thwarted through immediate suspension of operation upon intrusion detection. The quasi-stability will be described in more detail with the DRM.

(7) Buried Nucleus

Some instantiations of the 3-prong security/reliability/real-time distributed architecture of the present invention may require "buried" hardware resources to achieve the instantiations' security characterization. The buried nucleus concept will be described in more detail with the DRM.

(8) Adaptation

The 3-prong security/reliability/real-time distributed architecture of the present invention may support adaptive responses to changing conditions either autonomously or under supervision of a remote trusted authority. The adaptation may include self-healing and self-sealing behaviors.

(9) Reliability

The adaptive responses of the 3-prong security/reliability/real-time distributed architecture of the present invention to failure modes preferably permits continued aggregate functioning of client populations containing failed members, especially in large populations with failed members.

(10) Secure Protocol

The 3-prong security/reliability/real-time distributed architecture of the present invention may require use of a demonstrably secure adaptive protocol operating peer-to-peer and/or via a trusted authority to manage the system environment and assure system integrity.

(11) Ability to Rebuild After Intrusion

The 3-prong security/reliability/real-time distributed architecture of the present invention may support re-establishment of a demonstrably secure environment in the face of detected intrusions.

(12) Isochronous Real-Time Foundation

According to a preferred embodiment of the present invention, real-time functions are predicated on multiple independently synthesizable isochronous paths in the 3-prong security/reliability/real-time distributed architecture.

It is understood that the foregoing-described features are exemplary only and are not intended to limit the scope of the present invention. Those of ordinary skill in the art will understand that other features may also be included in the architecture of the present invention without departing from the scope and spirit of the present invention.

II. Architecture for Digital Rights Management (DRM)

As described above, the 3-prong security/reliability/real-time distributed architecture of the present invention may be implemented entirely in hardware, entirely in software, or in a combination of hardware and software. An exemplary hardware/software instantiation of the architecture of the present invention is described as follows in the context of digital rights management.

(1) Architecture

DRM poses one of the greatest challenges for content communities in the digital age. Traditional rights management of physical materials benefited from the materials' physicality (as this provided some barrier to unauthorized exploitation of content). However, because of the ease with which digital files may be copied and transmitted, serious breaches of copyright law are not uncommon in a connected society. Thus, one aspect of the DRM focuses on security and encryption as a means of preventing unauthorized copying. That is, DRM tries to lock the content (e.g. a movie in a DVD medium) and limit its distribution to only those paying through an authorization procedure. The level of security provided may be adjusted commensurate to content value.

Figure 2:
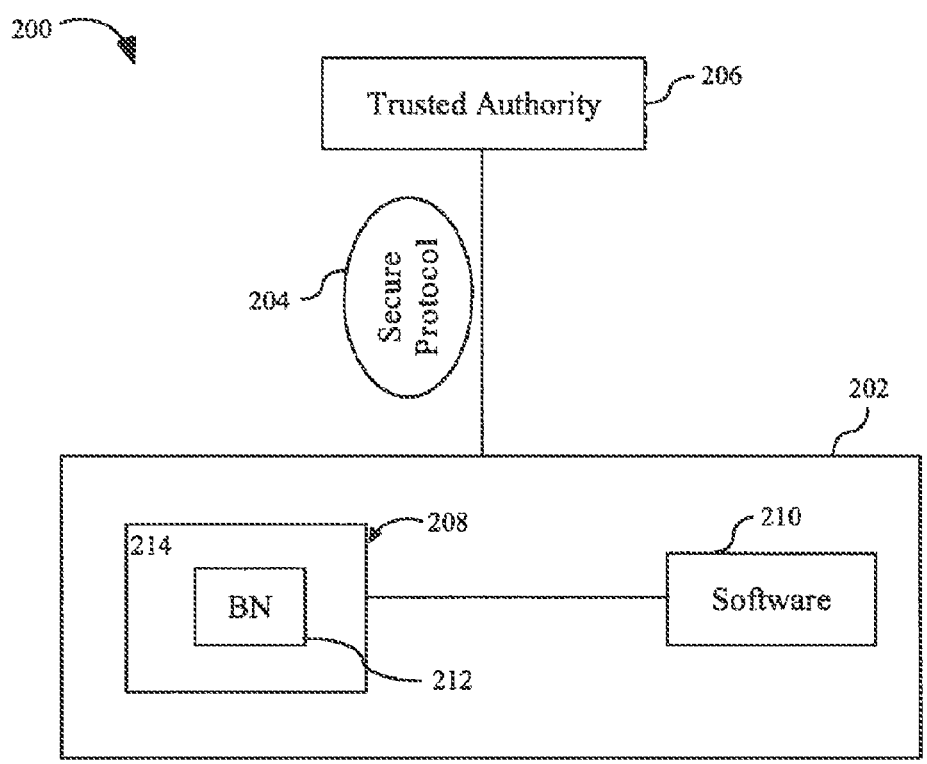
FIG. 2 is a simplified block diagram of an exemplary hardware/software instantiation of a 3-prong security/reliability/real-time distributed architecture in accordance with the present invention.

Referring now to FIG. 2, a simplified block diagram of an exemplary hardware/software instantiation of a 3-prong security/reliability/real-time distributed architecture 200 in accordance with the present invention is shown. The architecture 200 may increase the security for DRM purposes. The architecture 200 includes a hardware/software system 202, and a trusted authority 206 that generates a secure protocol 204. The secure protocol 204 may control the operation of the hardware/software system 202.

The hardware/software system 202 preferably includes a microchip 208 and software 210. The microchip 208 preferably includes a buried nucleus (BN) 212 and an outer region 214. The outer region 214 is the area of the microchip 208 other than the BN 212 and includes all the I/O (input/output) pins and pads of the microchip 208. The I/O pins of the microchip 208 are connected to the external software 210 which manipulates or controls these I/O pins.

The BN 212 may include resource sets such as a LFSR (linear feedback shift register), a reconfigurable core, a programmable logic block, a non-volatile RAM (e.g., magnetoresistive-RAM, ferroelectric-RAM), a matrix multiplier, and the like. Those of ordinary skill in the art will appreciate that other resources sets may also be included in the BN 212 without departing from the scope and spirit of the present invention.

The hardware/software system 202 may operate under the control of the secure protocol (i.e., protected protocol or encrypted protocol) 204 so that the hardware/software system 202 is actually set up and programmed by someone operating remotely by means of the secure protocol 204. By means of the secure protocol 204, a group of authorization information such as actual processing codes, keys (e.g., passwords), permissions, and metadata relating to the implementation of a DRM heuristic, and the like may be presented to the BN 214.

The trusted authority 206 may generate the secure protocol 204 which is preferably valid with respect to operations known to be supported by the BN 212. The trusted authority 206 may, for example, be a back-end server (which is assumed to be secure), a cell phone operator with a trusted command (and control center), an encrypted medium (which is assumed to be unique and uniquely in the possession of an authorized user of this particular instantiation of the architecture), or the like. The trusted authority 206 delivers the group of authorization information through the secure protocol 204 into the BN 212. The trusted authority 206 may be in a vault. The trusted authority 206 may be operated according to some encryption or security measures.

One fundamental task of the BN 212 is to accept a key delivered through the secure protocol 204. The key may be presented in an encrypted form. Those of ordinary skill in the art will understand that various encryption, decryption and data-protection mechanisms may be utilized during the process of presenting and delivering the key. For example, digital watermarking, fast elliptical algorithms, Triple DES (also 3DES), and other contemporary algorithms may be utilized. In a preferred embodiment, the Rijndael algorithm is utilized.

The group of authorization information may be conveyed securely through the protocol 204 into the BN 212, which then operates and returns a result. The result may be used to activate an operation (e.g., playing a DVD medium) being authorized by means of an interaction between the secure protocol 204 and the BN 212. A critical aspect of this architecture 200 is the interaction that is set up between the trusted authority 206 and the BN 214 itself, and the activity that is set in motion by conveying the key and the relevant information through the secure protocol 204 into the BN 212.

According to the present invention, the BN 212 is unavailable to inspection by an attacker (e.g., a hacker) when the BN 212 is in operation. That is, although an attacker may grind the BN 212 down, photolithograph (or photomicrograph) the circuitry of the BN 212 at each level, and view the BN 212 in a static plan, the attacker is not able to inspect the BN 212 when the BN 212 is in operation.

Thus, even if an attacker, in principle, is able to inspect the secure protocol 204, inspect the software 210, inspect the process of the key and relevant information being presented by the software 210 to the microchip 208, and even potentially inspect the outer region 214 (i.e., all of the signals, all of the gates, all of the circuitry including the signal lines between the BN 212 and the outer region 214, and the like, in the outer region 214), when the key and relevant information are presented to the BN 212, the attacker no longer has access. Therefore, all of the operations carried out by resource sets interior to the BN 212 are inaccessible to an attacker.

Since the key is deciphered inside the BN 212, and since the BN 212 is not accessible for inspection by an attacker when the BN 212 is in operation, the architecture 200 may thus defeat the attacker's attempt to get access to protected content.

(2) Grid Dribble Attack

Figure 3:
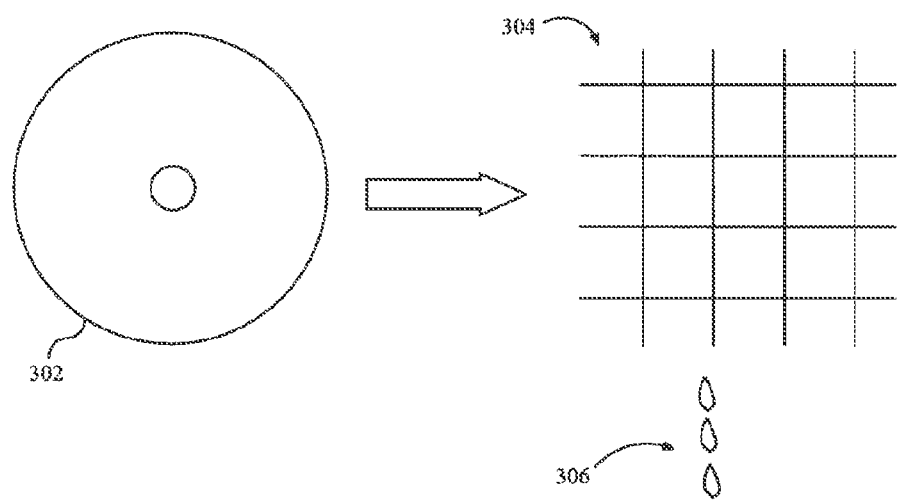
FIG. 3 shows a derivative approach (grid dribble attack) to violating copyright on a digital medium.

FIG. 3 shows a derivative approach (grid dribble attack) to violating copyright on a digital medium. This form of attack is preferred by many hackers. A DVD 302 may contain an encrypted copy of content (e.g., movie, or the like). The DVD 302 is submitted to the Internet to a grid of computers 304. These computers 304 may be authorized users and have keys to decipher the encrypted content stored on the DVD 302. When these computers 304 apply decryption techniques to the encrypted movie on the DVD 302, correlated deciphered bits 306 of the movie may dribble out, bit by bit. It may take some time (e.g., six months) for the several hundreds of billions of bits that make up the target content to dribble out. However, once this happens, a perfect digital copy of the copyrighted content may then be presented on the Internet for unauthorized coping. Because there is no DRM system to ensure against this grid dribble attack which takes part in encryption mechanism bit by bit and dribbles out the results, content creators are extremely reluctant to make available digital content for general distribution.

Figure 4:
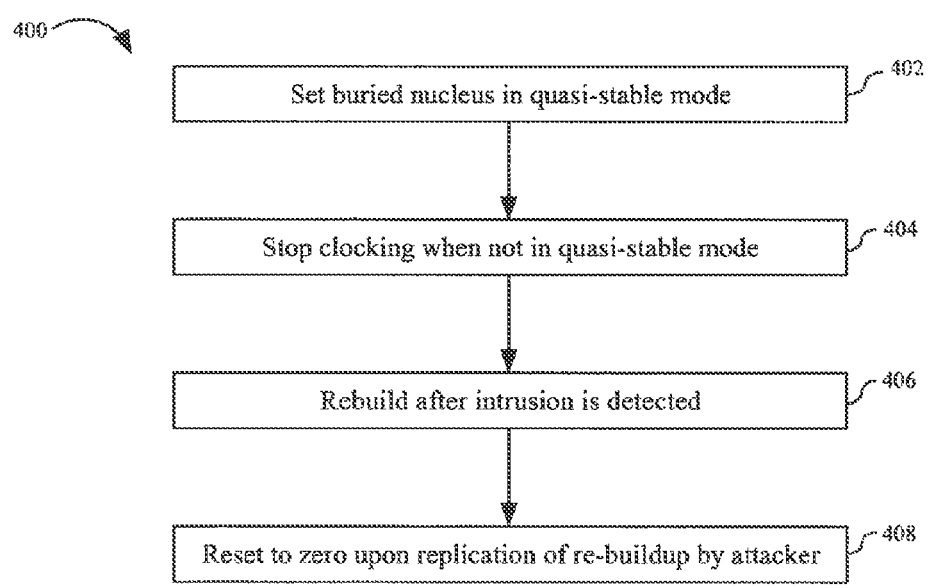
FIG. 4 is a flowchart illustrating an exemplary process for protecting against a grid dribble attack in accordance with an exemplary embodiment of the present invention.

FIG. 4 is a flowchart illustrating an exemplary process 400 for protecting against a grid dribble attack in accordance with the present invention. The process 400 may be implemented in the architecture 200 shown in FIG. 2.

The process 400 starts with a step 402 in which a BN is set in a quasi-stable mode (knife-edge stability). Among the resources architecture may make available include timer banks (essential for delivering quality service, e.g., high-quality digital video and audio). These timer banks are programmable. According to the present invention, the timer banks are set up in such a way that the timer banks may be presented with a bit string providing the time banks with certain pseudorandom temporal variability called a form jitter. Strictly speaking, the form jitter is not a jitter in an engineering term, but is a kind of pseudorandom variability that is knowable if one knows the bit string presented to the BN, which, in turn, is applied to the timer banks to set up the operation of the timer banks Therefore, these timer banks are almost exactly right, but not exactly right.

According to the present invention, the bit string may be set up by one of the keys delivered by a secured protocol. Thus, in setting up a quasi-stable operation within the BN, one piece of information conveyed is preferably a key (for example, in a public key cryptosystem or a variant of a well-known public key cryptosystem). The key, instead of being applied to a difficult NP-hard problem (e.g., factoring very large prime numbers), is employed in conjunction with other keys to the creation of the quasi-stable BN mode of operation.

The quasi-stable mode of operation (step 402) means that an architecture is jittering ever so slightly and has an ability to compare its operation to the operation that would be dictated by one and only one such secret key presented to the timer banks Such an ability provides a means for intrusion detection.

Next, in step 404 in the event of an attempt to invade the architecture, the clocking of some operations inside the BN may deviate (even if slightly) from the unpredictable but nevertheless well-known pattern of temporal behavior that is dictated by the key presented by the secure protocol, a mechanism may be triggered to stop the clock from running and cease the operation of the BN. In other words, upon the detection of an intrusion, because the timing regime that has been set up is violated ever so slightly, the architecture basically stops working This does not necessarily mean that the architecture as a whole ceases operation in the event of a detected intrusion because the architecture may start a re-buildup process (see step 406 below).

Next, in step 406, in the event of detected intrusion, the secure protocol, which is generated by the trusted authority, begins a process of re-establishing, through challenge and response, the buildup in a tiered hierarchical manner of a secure environment within the BN. If the attacker attempts to replicate this buildup, the attacker may only do it by having knowledge of the random characteristics of the secure protocol.

Thus, the architecture of the present invention is assailable only if both the BN and the trusted authority are compromised. Under extraordinary circumstances, such a thing may happen (as shown in FIG. 1, any architecture is theoretically breakable). In other words, hackers, burglars, thieves, or other unauthorized personnel may gain access to the trusted authority and one or more instances of the architecture under some extraordinary circumstances. When this happens, the clock is stopped and the attack effort is entirely reset to zero. That is, the validity of any element that might have eventuated from such an attack is completely nullified by the act of stopping the clock at this point. Therefore, intrusion, no matter how powerful the computational resources supplied to the intrusion, has the effect of resetting the effort involved to zero.

It is understood that there are thermodynamic principles that may permit an attacker, given sufficient determination, to override even this process 400. However, the reset-to-zero requirement and the proof against dribbling out bits in a concerted grid attack are more than ample to meet the needs of the great bulk of DRM requirements content creators have raised.

It is noted that although the architecture 200 shown in FIG. 2 and the process 400 shown in FIG. 4 are directed to the problem of DRM, they may also be applied to ATMs, other secured communications, TEMPEST requirements, or the like without departing from the scope and spirit of the present invention.

It is understood that the reliability aspect and the real-time behavior aspect relate to "knife-edge stability" described in the process 400 shown in FIG. 4. Those of ordinary skill in the art will appreciate that the interrelationship among security, reliability, and real-time behavior is intimately related in terms of how the resources are specified. In the architecture of the present invention, this interrelationship is exploited to create a very efficient architecture delivering the characterizable functions of the present invention.

It is to be noted that the above described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of software package. Such a software package may be a computer program product which employs a storage medium including stored computer code which is used to program a computer to perform the disclosed function and process of the present invention. The storage medium may include, but is not limited to, any type of conventional floppy disks, optical disks, CD-ROMS, magneto-optical disks, ROMs, RAMs, EPROMs, EEPROMs, magnetic or optical cards, or any other suitable media for storing electronic instructions.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for protecting encrypted information, comprising steps of: (a) setting a buried nucleus in a quasi-stable mode of operation, including: (a1) delivering a key through a secure protocol to said buried nucleus; (a2) setting up a bit string by said key; and (a3) giving a set of timer banks a pseudorandom temporal variability by said bit string; (b) stopping clocking when said buried nucleus deviates from said quasi-stable mode; (c) rebuilding a secure environment within said buried nucleus after an intrusion is detected; and (d) resetting an attack associated with said detected intrusion to zero when replication of re-buildup by an attacker is detected.

2. An apparatus for protecting encrypted information, comprising: (a) means for setting a buried nucleus in a quasi-stable mode of operation, including: (a1) means for delivering a key through a secure protocol to said buried nucleus; (a2) means for setting up a bit string by said key; and (a3) means for giving a set of timer banks a pseudorandom temporal variability by said bit string; (b) means for stopping clocking when said buried nucleus deviates from said quasi-stable mode; (c) means for rebuilding a secure environment within said buried nucleus after an intrusion is detected; and (d) means for resetting an attack effort associated with said detected intrusion to zero when replication of re-buildup by an attacker is detected.

3. A non-transitory computer-readable medium having computer-executable instructions for performing a method comprising steps of: (a) setting a buried nucleus in a quasi-stable mode of operation, including: (a1) delivering a key through a secure protocol to said buried nucleus; (a2) setting up a bit string by said key; and (a3) giving a set of timer banks a pseudorandom temporal variability by said bit string; (b) stopping clocking when said buried nucleus deviates from said quasi-stable mode; (c) rebuilding a secure environment within said buried nucleus after an intrusion is detected; and (d) resetting an attack effort associated with said detected intrusion to zero when replication of re-buildup by an attacker is detected.

* * * * *